No. 673,187. Patented Apr. 30, 1901.
H. W. WILCOX.
LIQUID MEASURING DEVICE.
(Application filed Dec. 24, 1900.)
(No Model.)
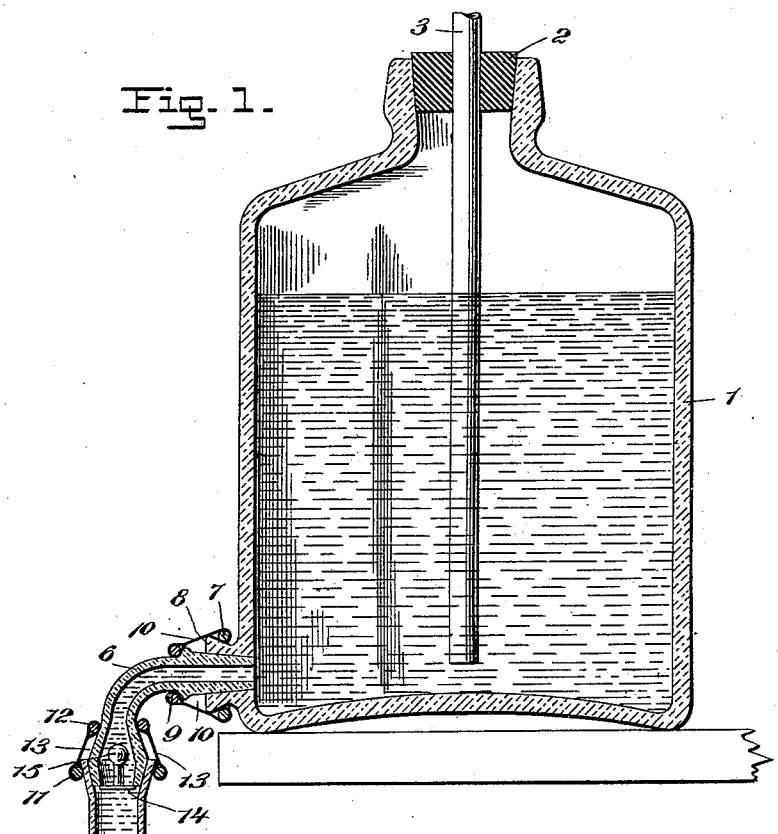
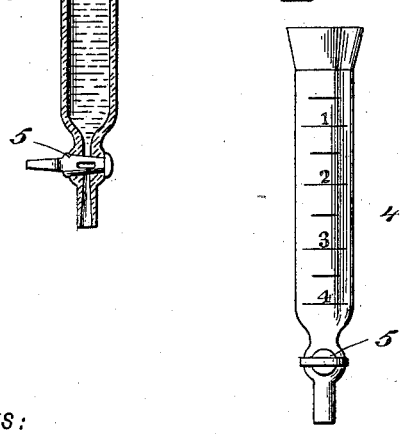
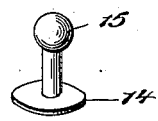
WITNESSES:
INVENTOR
Horace W. Wilcox
BY
ATTORNEYS

UNITED STATES PATENT OFFICE.

HORACE W. WILCOX, OF HAMILTON, CANADA.

LIQUID-MEASURING DEVICE.

SPECIFICATION forming part of Letters Patent No. 673,187, dated April 30, 1901.

Application filed December 24, 1900. Serial No. 40,997. (No model.)

*To all whom it may concern:*

Be it known that I, HORACE W. WILCOX, a citizen of the United States of America, and a resident of Hamilton, in the Province of Ontario and Dominion of Canada, have invented a new and Improved Liquid-Measuring Device, of which the following is a full, clear, and exact description.

This invention relates to improvements in measuring devices for liquids; and the object is to provide a simple device for this purpose that may be readily attached to a vessel and by means of which a liquid, such as acid, may be drawn from the vessel in desired quantities.

I will describe a liquid-measuring device embodying my invention and then point out the novel features in the appended claims.

Reference is to be had to the accompanying drawings, forming a part of this specification, in which similar characters of reference indicate corresponding parts in all the figures.

Figure 1 is a sectional elevation of a vessel and a measuring device embodying my invention as applied thereto. Fig. 2 is a side view of the graduating or measuring tube, and Fig. 3 is a perspective view of an indicating device movable in the tube.

Referring to the drawings, 1 designates a bottle or vessel of any desired shape and size. Extended through the stopper 2 of the vessel and nearly to the bottom thereof is a constant-pressure tube 3, of the usual construction and designed to maintain a constant or uniform pressure of liquid issuing from the vessel. Connecting with the lower portion of the vessel and extended downward therefrom is a graduating or measuring tube 4, consisting of transparent material, such as glass, and having graduation-marks thereon, as plainly indicated in Fig. 2. The lower end of the tube 4 is reduced in diameter, and in this reduced portion is a plug-valve 5. The tube is connected to the vessel by means of an elbow-section 6, the inner end of which passes into an opening formed in the wall of the vessel, and the outer end of said elbow is longitudinally tapered to engage in a corresponding taper at the upper end of the tube 4. The connections between the elbow and the vessel and also with the tube will be ground, so as to prevent any possible leakage of liquid. The elbow 6 may be removably connected to the vessel 1 by any desired means. I have here shown a ring 7 extending around a lug 8, in which an opening for the elbow end is formed, and a ring 9 engaging against a rim on the elbow, and between these two rings 7 and 9 are connecting devices 10, consisting of wire or any other suitable material. The tube 4 is removably connected to the outer end of the elbow by similar devices—that is, rings 11 and 12 engage, respectively, with the tube and with the elbow and have connections 13.

Movable in the tube 4 is an indicating device made in the form of a float, consisting of a disk 14, of platinum or other material not acted on by the liquid with which it is used. This disk has a size but slightly smaller than the interior of the tube, so that said disk may move freely up and down. The float or disk 14 is held in horizontal position or prevented from tipping sidewise by a float-bulb 15, connected to the disk by a stem, as clearly indicated in the drawings, the specific gravity of the float-bulb being less than that of the liquid.

In operation when it is desired to draw off a quantity of liquid the vessel designed to receive the same is placed underneath the outlet of the tube 4. It will be understood that this tube is at all times filled with liquid. Upon opening the valve 5 the liquid will flow out, and during the flow of the liquid the float or indicator 14 will move downward, and when this indicator reaches a point opposite a graduating-mark which indicates the desired quantity to be withdrawn the valve is to be closed, and then the float will rise and assume its normal position at the top of the tube, as indicated in Fig. 1.

Having thus described my invention, I claim as new and desire to secure by Letters Patent—

1. A measuring device for liquids, comprising a graduated tube adapted for connection with a liquid-containing vessel, a valve for controlling an outlet at the lower end of the tube, a float in the tube operating to indicate the quantity of liquid discharged by moving downward with discharging liquid, while the tube is filled with liquid above the float and a float-bulb on the disk for holding the said disk in horizontal position while moving, substantially as specified.

2. A measuring device for liquids, comprising a graduated tube, a valve for controlling an outlet at the lower end of the tube, the upper end of the tube being adapted for connection with a liquid-container and from which container the tube is kept filled with liquid, a float-disk operating to indicate the amount of discharge by moving downward in the tube, and a float-bulb on the disk for holding the disk in horizontal position while both the disk and bulb are entirely submerged, substantially as specified.

In testimony whereof I have signed my name to this specification in the presence of two subscribing witnesses.

HORACE W. WILCOX.

Witnesses:
RICHARD BUTLER,
C. S. TREE.